United States Patent
Lee

(10) Patent No.: US 7,202,595 B2
(45) Date of Patent: Apr. 10, 2007

(54) GREEN PHOSPHOR FOR PLASMA DISPLAY PANEL AND PLASMA DISPLAY PANEL COMPRISING THE SAME

(75) Inventor: Sung-Yong Lee, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/028,217

(22) Filed: Jan. 4, 2005

(65) Prior Publication Data

US 2005/0162062 A1    Jul. 28, 2005

(30) Foreign Application Priority Data

Jan. 26, 2004 (KR) .................. 10-2004-0004665

(51) Int. Cl.
H01J 1/62 (2006.01)
H01J 63/04 (2006.01)
H01J 17/49 (2006.01)

(52) U.S. Cl. .............. 313/485; 313/484; 313/486; 313/582

(58) Field of Classification Search ........ 313/485, 313/486
See application file for complete search history.

(56) References Cited

U.S. PATENT DOCUMENTS 5,541,618 A    7/1996    Shinoda
5,661,500 A    8/1997    Shinoda et al.
5,663,741 A    9/1997    Kanazawa
5,674,553 A    10/1997   Shinoda et al.

(Continued)

FOREIGN PATENT DOCUMENTS

CN    1305212    7/2001

(Continued)

OTHER PUBLICATIONS

"*Final Draft International Standard*", Project No. 47C/61988-1/Ed. 1; Plasma Display Panels—Part 1: Terminology and letter symbols, published by International Electrotechnical Commission, EEC. in 2003, and Appendix A—Description of Technology, Annex B—Relationship Between Voltage Terms And Discharge Characteristics; Annex C—Gaps and Annex D—Manufacturing.

*Primary Examiner*—Nimeshkumar D. Patel
*Assistant Examiner*—Natalie K. Walford
(74) *Attorney, Agent, or Firm*—Robert E. Bushnell, Esq.

(57) ABSTRACT

A green phosphor for a plasma display panel has improved color purity, improved lifespan, and improved discharge stability. The green phosphor comprises a core including at least one first phosphor material selected from the group consisting of $Zn_2SiO_4$:Mn, $(Zn,A)_2SiO_4$:Mn (A is an alkaline earth metal), $(Ba,Sr,Mg)O \cdot \alpha Al_2O_3$:Mn ($\alpha$ is an integer in a range of 1 to 23), and $MgAl_xO_y$:Mn (x is an integer in the range of 1 to 10, and y is an integer in a range of 1 to 30), and a coating layer including a second phosphor which is present on the surface of the first phosphor, and which is at least one selected from the group consisting of $LaMgAl_xO_y$:Tb:Tb (x is an integer in the range of 1 to 14, and y is an integer in the range of 8 to 47), $ReBO_3$:Tb (Re is a rare earth element selected from the group consisting of Sc, Y, La, (Ce, and Gd), and $(Y, Gd)BO_3$:Tb.

23 Claims, 1 Drawing Sheet

U.S. PATENT DOCUMENTS

| | | |
|---|---|---|
| 5,724,054 A | 3/1998 | Shinoda |
| 5,786,794 A | 7/1998 | Kishi et al. |
| 5,952,782 A | 9/1999 | Nanto |
| RE37,444 E | 11/2001 | Kanazawa |
| 6,630,916 B1 | 10/2003 | Shinoda |
| 6,707,436 B2 | 3/2004 | Setoguchi et al. |
| 6,753,645 B2 * | 6/2004 | Haruki et al. ............... 313/582 |
| 6,998,779 B2 * | 2/2006 | Choi ........................ 313/582 |
| 7,030,549 B2 * | 4/2006 | Dutta ....................... 313/484 |
| 7,037,445 B2 * | 5/2006 | Nukuta et al. ............. 313/486 |
| 2003/0085853 A1 * | 5/2003 | Shiiki et al. ................. 345/60 |
| 2004/0239245 A1 * | 12/2004 | Kawamura et al. ......... 313/582 |
| 2005/0127811 A1 * | 6/2005 | Choi et al. .................. 313/582 |
| 2005/0258750 A1 * | 11/2005 | Akiyama et al. ........... 313/582 |
| 2006/0038491 A1 * | 2/2006 | Akiyama et al. ........... 313/582 |
| 2006/0097635 A1 * | 5/2006 | Seo et al. ................... 313/582 |

FOREIGN PATENT DOCUMENTS

| | | |
|---|---|---|
| CN | 1417831 | 5/2003 |
| JP | 02-148645 | 6/1990 |
| JP | 2845183 | 10/1998 |
| JP | 2917279 | 4/1999 |
| JP | 11185635 A * | 7/1999 |
| JP | 2001-043804 | 2/2001 |
| JP | 2001-325888 | 11/2001 |
| KR | 2000-60401 | 10/2000 |
| KR | 2001-62387 | 7/2001 |
| KR | 1020030036017 | 5/2003 |
| KR | 2003054956 A * | 7/2003 |
| KR | 2005041699 A * | 5/2005 |
| KR | 2005052234 A * | 6/2005 |

* cited by examiner

GREEN PHOSPHOR FOR PLASMA DISPLAY PANEL AND PLASMA DISPLAY PANEL COMPRISING THE SAME

CLAIM OF PRIORITY

This application makes reference to, incorporates the same herein, and claims all benefits accruing under 35 U.S.C. §119 from an application for GREEN PHOSPHOR FOR PLASMA DISPLAY PANEL AND PLASMA DISPLAY PANEL COMPRISING THE SAME earlier filed in the Korean Intellectual Property Office on 26 Jan. 2004 and thereby duly assigned Ser. No. 10-2004-0004665.

BACKGROUND OF THE INVENTION

1. Technical Field

The present invention relates to a green phosphor for a plasma display panel and a plasma display panel comprising the same and, more particularly, to a green phosphor for a plasma display panel having improved color purity, lifespan, and discharge stability, and a plasma display panel comprising the same.

2. Related Art

A plasma display panel (PDP) is a flat display device using a plasma phenomenon, which is also called a gas-discharge phenomenon since a discharge is generated in the panel when a potential greater than a certain level is applied to two electrodes separated from each other under a gas atmosphere in a non-vacuum state. Such gas-discharge phenomenon is applied to display an image in the plasma display panel.

The plasma display panel currently in general use is an alternating current (AC) driven plasma display panel, wherein a phosphor pattern is formed on barrier ribs of a rear substrate.

A plurality of barrier ribs are disposed between a front substrate and a rear substrate with a certain distance therebetween to form a discharge cell. In the cell space, red, green and blue phosphors are formed. On the rear substrate, address electrodes, to which address signals are to be applied, are formed. On the front substrate, a pair of sustain electrodes is formed in one discharge cell in a direction perpendicular to that of the address electrodes. A discharge gas, such as Ne—Xe or He—Xe, is injected into the discharge space. That is, three electrodes are mounted in the discharge space of the plasma display panel, which is coated with the red, the green, and the blue phosphors in a regular pattern. When a certain level of voltage is applied between these electrodes, plasma discharge occurs so as to generate ultraviolet rays, and thereby the phosphors are excited to emit light.

In order to realize uniform and stable discharge of the plasma display panel, a surface potential of the phosphor should be high, and thus gaseous anions should collide with the phosphor layer at a high velocity. Therefore, the higher the surface potential of the phosphor, the larger the potential difference between the phosphor and anions, and stable emitting properties and plasma discharge can be realized. This phosphor is generally manufactured by mixing solid raw powdery materials, and sintering the mixture at a high temperature. The surface potential of the phosphor can be varied according to the composition and properties of the raw materials.

$Zn_2SiO_4$:Mn, the most popular green phosphor, has been prepared by mixing the raw materials ZnO, $SiO_2$, and $MnCO_3$, resulting in an end product having a non-uniform composition and an intermediate product. The green phosphor has a negative surface potential.

The negative surface potential of the phosphor has an effect on the surface potential and causes the discharge voltage of green cells to increase. The mechanism for increasing the discharge voltage may be described as follows. Upon occurrence of the reset discharge, the driving of an alternating current plasma display during the real discharge, that is, before the discharge voltage is applied to the address electrode terminal, is such that wall charge is accumulated. As the green phosphor having negative surface potential characteristics absorbs or counterbalances the wall charge of cations, the green cell generates a smaller discharge voltage between the front and rear substrates compared to the discharge voltages of the red cell and blue cell. Accordingly, the green cell comprising a green phosphor with a negative surface potential may require an address voltage which is higher compared to the address voltages of the red cell and the blue cell. There has been research into a green phosphor having positive surface potential similar to the red and blue phosphors.

In order to solve the problems relating to $Zn_2SiO_4$:Mn, Korean Patent Laid-Open Publication No. 2001-62387 discloses a green phosphor in which $YBO_3$:Tb is added to $Zn_2SiO_4$:Mn. However, the obtained green phosphor has a color purity which is deteriorated. Further, Korean Patent Laid-Open Publication No. 2000-60401 discloses a green phosphor in which a positive charged material of zinc oxide and magnesium oxide is added to $Zn_2SiO_4$:Mn. However, the green phosphor obtained from this method also has a problem in that it has a color purity and a lifespan which are deteriorated.

SUMMARY OF THE INVENTION

A primary object of the present invention is to provide a green phosphor for a plasma display panel having good color purity, good lifespan characteristics, and good discharge stability.

Another object of the present invention is to provide a plasma display panel having good color purity, good lifespan characteristics, and good discharge stability.

In order to achieve these objects, the present invention provides a green phosphor for a plasma display panel, comprising: a core including at least one first phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and a coating layer including a second phosphor which is present on the surface of the first phosphor, and which is at least one selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

The present invention also provides a plasma display panel including a phosphor layer which comprises a red phosphor pattern, a green phosphor pattern, and a blue phosphor pattern, the green phosphor pattern comprising the above green phosphor formed in a green discharge cell.

The present invention also provides a plasma display panel which comprises at least two thin green phosphor layers as follows: a first phosphor layer formed in discharge cell and comprising a phosphor material selected from the group consisting of $Zn_2SiO_4$:Mn, $(Zn,A)_2SiO_4$:Mn (A is an alkaline earth metal), $(Ba,Sr,Mg)O \cdot \alpha Al_2O_3$:Mn (a is an integer in the range of 1 to 23), and $MgAl_xO_y$:Mn (x is an integer in the range of 1 to 10, and y is an integer in the range of 1 to 30); and a second phosphor formed on the first phosphor layer and comprising a phosphor material selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and (Y, Gd)$BO_3$:Tb.

The present invention also provides a plasma display panel which comprises: a first phosphor layer which is formed by coating of phosphor particles in a discharge cell, and which comprises a phosphor material selected from the group consisting of $Zn_2SiO_4$:Mn, $(Zn,A)_2SiO_4$:Mn (A is an alkaline earth metal), $(Ba,Sr,Mg)O \cdot \alpha Al_2O_3$:Mn (a is an integer in the range of 1 to 23), and $MgAl_xO_y$:Mn (x is an integer in the range of 1 to 10, and y is an integer in the range of 1 to 30); and a second phosphor which is a thin layer formed on the first phosphor layer, and which comprises a phosphor material selected from the group consisting of a $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and (Y, Gd)$BO_3$:Tb.

Other features and/or advantages of the present invention will be apparent from the following description taken in conjunction with the accompanying drawing, in which like reference characters designate the same or similar parts throughout the figure.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing in which like reference symbols indicate the same or similar components, wherein.

DETAILED DESCRIPTION OF THE INVENTION

Figure 1:
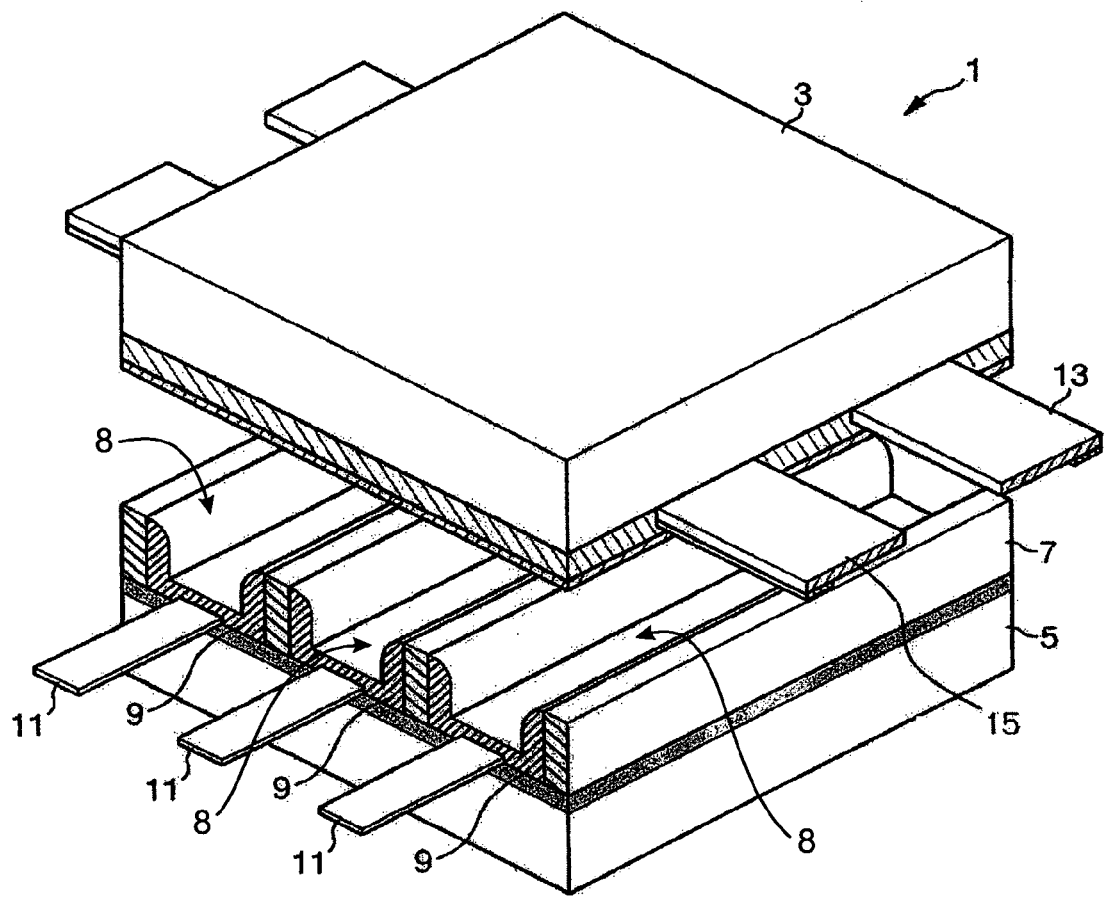
FIG. 1 is a perspective view showing the structure of a plasma display panel.

In the following detailed description, embodiments of the invention have been shown and described simply by way of illustration of the best mode contemplated by the inventors of carrying out the invention. As will be realized, the invention is capable of modification in various respects, all without departing from the invention. Accordingly, the drawing and the description are to be regarded as illustrative in nature, and not restrictive.

FIG. 1 is a perspective view of plasma display panel. As shown in FIG. 1, in the plasma display panel 1, plural barrier ribs 7 are disposed between a front substrate 3 and a rear substrate 5 with a certain distance therebetween so as to form discharge cells 8. In the cells 8, red, green and blue phosphors 9 are formed. Address electrodes 11, to which address signals are to be applied, are formed on rear substrate 5. A pair of sustain electrodes, consisting of an X sustain electrode 13 and a Y sustain electrode 15, is formed in one discharge cell 8 in a direction perpendicular to that of the address electrodes 11. A discharge gas, such as Ne—Xe or He—Xe, is injected into the discharge space or cells 8 between the front substrate 3 and the rear substrate 5. That is, three electrodes 11, 13, and 15, are mounted in each discharge space or cell 8 of the plasma display panel 1, which is coated with the red phosphor, the green phosphor, and the blue phosphor in a regular pattern. When a certain level of voltage is applied between these electrodes, plasma discharge occurs so as to generate ultraviolet rays, and thereby the phosphors are excited to emit light.

Figure 2:
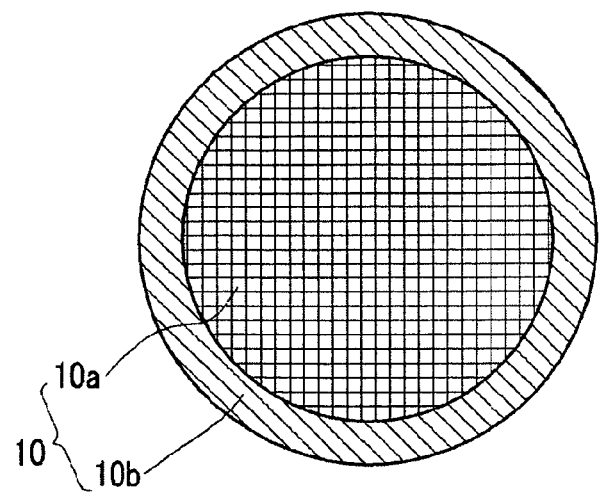
FIG. 2 is a cross-section view of a phosphor in the plasma display panel.

According to one advantageous embodiment of the present invention, with respect to FIG. 2, the green phosphor 10 for the plasma display panel comprises: a core 10a including at least one first phosphor material selected from the group consisting of $Zn_2SiO_4$:Mn, $(Zn,A)_2SiO_4$:Mn (A is an alkaline earth metal), $(Ba,Sr,Mg)O \cdot \alpha Al_2O_3$:Mn ($\alpha$ is an integer in the range of 1 to 23), and $MgAl_xO_y$:Mn (x is an integer in the range of 1 to 10, and y is an integer in the range of 1 to 30); and a coating layer 10b including a second phosphor which is present on the surface of the first phosphor, and which is at least one selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and (Y, Gd)$BO_3$:Tb.

The green phosphor 10 is, preferably, composed of a core 10a including a Zn-based phosphor, and a coating layer 10b including a Y-based phosphor. Examples of the Zn-based phosphor are $Zn_2SiO_4$:Mn, $(Zn,A)_2SiO_4$:Mn (A is an alkaline earth metal), etc., while examples of the Y-based phosphor are YBO3:Tb, (Y, Gd)$BO_3$:Tb, etc. The phosphor of the present invention has good brightness properties, good discharge stability, and a good lifespan, as a result of coating a Zn-based phosphor having a relatively low surface potential with a Y-based phosphor having a relatively high surface potential to form a double-layered phosphor.

The coating layer 10b is formed to a thickness through which vacuum ultraviolet (VUV) rays can be transmitted. Considering the above, the coating layer 10b is preferably a mono-particle layer having a thickness ranging from about 1 to 100 nm, and more preferably from 2 to 50 nm. When the coating layer 10b has a thickness of less than 1 nm, the coating effect is not sufficient to protect the Zn-based phosphor, and when the coating layer 10b has a thickness of more than 100 nm, the transmitted amount of VUV rays is too low to realize the core phosphor properties.

The double-layered phosphor can be prepared by coating a second phosphor material 10b on the core of a first phosphor particle 10a using a deposition method. The deposition method can be plasma-enhanced chemical vapor deposition (PECVD), chemical vapor deposition (CVD), sputtering, electron beam evaporation, vacuum thermal evaporation, laser ablation, thermal evaporation, laser chemical vapor deposition, zet vapor deposition, and so on, but is not limited thereto.

In the above first embodiment of the invention, a double-layered phosphor is described, but a phosphor with at least two coating layers can be included in the present invention as necessary.

According to a second advantageous embodiment of the invention, a plasma display panel is prepared by coating the double-layered phosphor on the surface of the discharge cell to form a green phosphor layer. The green phosphor is added to a binder and a solvent to provide a phosphor paste, and the resultant phosphor paste is coated on the surface of the discharge cell to provide a phosphor layer.

The binder may include, but is not limited to, a cellulose-based resin, an acryl-based resin, or a mixture thereof. The cellulose-based resin may be methyl cellulose, ethyl cellulose, propyl cellulose, hydroxy methyl cellulose, hydroxy ethyl cellulose, hydroxy propyl cellulose, hydroxy ethyl propyl cellulose, or a mixture thereof. The acryl-based resin may be a copolymer of an acrylic monomer, such as poly methyl methacrylate, poly isopropyl methacrylate, poly isobutyl methacrylate, methyl methacrylate, ethyl methacrylate, propyl methacrylate, butyl methacrylate, hexyl methacrylate, 2-ethyl hexyl methacrylate, benzyl methacrylate, dimethyl amino ethyl methacrylate, hydroxy ethyl methacrylate, hydroxy propyl methacrylate, hydroxy butyl methacrylate, phenoxy 2-hydroxy propyl methacrylate, glycidyl methacrylate, methyl acrylate, ethyl acrylate, propyl acrylate, butyl acrylate, hexyl acrylate, 2-ethyl hexyl acrylate, benzyl acrylate, dimethyl amino ethyl acrylate, hydroxy ethyl acrylate, hydroxy propyl acrylate, hydroxy butyl acrylate, phenoxy 2-hydroxy propyl acrylate, glycidyl acrylate, or a mixture thereof. If desired, a small amount of inorganic binder may be added to the phosphor paste composition. The amount of the binder is advantageously about 2% to about 8% by weight relative to the phosphor paste composition.

The solvent may include any conventional solvent for the phosphor paste composition, such as alcohol-based, ether-based, or ester-based solvents, or a mixture thereof, and more advantageously butyl cellosolve (BC), butyl carbitol acetate (BCA), terpineol, or a mixture thereof. When the amount of the solvent is outside the above-mentioned range, the rheology is inappropriate so that it is hard to apply the phosphor layer. Considering this point, the amount of the solvent is advantageously between about 25% and about 75% by weight.

Other agents may be added to improve the rheology and the processibility of the composition. The agents may include, but are not limited to, a photosensitizer such as benzophenone, a dispersing agent, a silicon-based antifoaming agent, a smoothing agent, a plasticizer, an antioxidant, or a mixture thereof, all of which are commercially available to one skilled in the art.

As the various manufacturing methods and structures of the phosphor layer for the plasma display panel are known to one having ordinary skill in the art, a detailed description relating thereto is omitted herein.

According to a third advantageous embodiment of the invention, a plasma display panel comprises at least two thin green phosphor layers as follows: a first phosphor layer formed in a discharge cell and comprising a phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and a second phosphor formed on the first phosphor layer and comprising a phosphor material selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

It is preferable that the plasma display panel of the invention comprise at least two thin green phosphor layers as follows: a first phosphor layer formed in the discharge cell and comprising a Zn-based phosphor material, and a second phosphor formed on the first phosphor layer and comprising a Y-based phosphor material. Examples of the Zn-based phosphor are $Zn_2SiO_4$:Mn, $(Zn,A)_2SiO_4$:Mn(A is an alkaline earth metal), etc., and examples of the Y-based phosphor are $YBO_3$:Tb, $(Y, Gd)BO_3$:Tb, etc. The multi-layered phosphor layer of the present invention has good brightness properties, good discharge stability, and a good lifespan as a result of forming the Zn-based phosphor layer having a relatively low surface potential as an under layer, and the Y-based phosphor having a relatively high surface potential thereon.

The thickness of the first phosphor layer is not particularly limited. The second phosphor layer is formed to a thickness through which vacuum ultraviolet (VUV) rays can be transmitted. Considering the above, the second phosphor layer preferably has a thickness ranging from about 1 to 100 nm, and more preferably from 2 to 50 nm. When the layer has a thickness of less than 1 nm, the multi-layered effect is not sufficient to protect the Zn-based phosphor, and when the layer has a thickness of more than 100 nm, the transmitted amount of VUV rays is too low to realize the phosphor properties of the underlayer.

The thin layer can be prepared using a deposition method. The deposition method can be plasma-enhanced chemical vapor deposition (PECVD), chemical vapor deposition (CVD), sputtering, electron beam evaporation, vacuum thermal evaporation, laser ablation, thermal evaporation, laser chemical vapor deposition, zet vapor deposition, and so on, but is not limited thereto.

According to a fourth advantageous embodiment of the invention, the plasma display panel comprises: a first phosphor layer formed by coating phosphor particles in a discharge cell, and comprising a phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and a second phosphor which is a thin layer formed on the first phosphor layer, and comprising a phosphor material selected from the group consisting of a $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

It is preferable that the plasma display panel comprise a first phosphor layer formed by coating phosphor particles in a discharge cell, and comprising a Zn-based phosphor material, and a second phosphor formed on the first phosphor layer, and comprising a Y-based phosphor material. Examples of the Zn-based phosphor are $Zn_2SiO_4$:Mn, $(Zn,A)_2SiO_4$:Mn (A is an alkaline earth metal), etc., and examples of the Y-based phosphor are $YBO_3$:Tb, $(Y, Gd)BO_3$:Tb, etc. The multi-layered phosphor layer of the present invention has good brightness properties, good discharge stability, and a good lifespan as a result of forming the Zn-based phosphor layer having a relatively low surface potential as an underlayer and the Y-based phosphor having a relatively high surface potential thereon.

The first phosphor layer can be formed by coating a paste comprising at least one phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30), and coating can be performed according to the same method as in the second advantageous embodiment. The second phosphor can be formed by the same method as in the third advantageous embodiment.

The thickness of the first phosphor layer is not particularly limited. The second phosphor layer is formed to a thickness through which vacuum ultraviolet (VUV) rays can be transmitted. Considering the above, the second phosphor layer preferably has a thickness ranging from about 1 to 100 nm, and more preferably from 2 to 50 nm. When the layer has a thickness of less than 1 nm, the multi-layered effect is not sufficient to protect the Zn-based phosphor, and when the layer has a thickness more than 100 nm, the transmitted amount of VUV rays is too low to realize the phosphor properties of the underlayer.

In the advantageous third and fourth embodiments, double-layered phosphor layers are described, but it is also possible to form the phosphors in three or more phosphor layers.

The following examples illustrate the present invention in further detail. However, it is to be understood that the present invention is not limited by these examples.

EXAMPLES AND COMPARATIVE EXAMPLES

Example 1

Green phosphors were prepared by coating $YBO_3$:Tb on the surface of $Zn_2SiO_4$:Mn to form a coating layer of about 5 nm using plasma-enhanced chemical vapor deposition where 100 mTorr of oxygen, 5 mTorr of a Y precursor, 5 mTorr of a B precursor, and 5 mTorr of a Tb precursor were injected simultaneously, and plasma was applied.

Example 2

Green phosphors were prepared by coating $YBO_3$:Tb on the surface of $Zn_2SiO_4$:Mn to form a coating layer of about 50 nm using a sputtering $YBO_3$:Tb target with a diameter of 4 inches under the conditions of an argon atmosphere, 5 mTorr of pressure, and 300 W RF of power for 10 minutes.

Example 3

The phosphor prepared in Example 1 was mixed and dispersed in a vehicle in which ethyl cellulose as a binder was dissolved in a mixed solvent of butyl carbitol acetate and terpineol with a mixing weight ratio of 3:7 to obtain a phosphor paste. The phosphor paste was coated in discharge cells, and sintered to provide a PDP having a green phosphor layer with a thickness of 20 µm.

Example 4

Zn2SiO4:Mn was deposited using Plasma Enhanced Chemical Vapor Deposition in a discharge cell to form a first phosphor thin layer with a thickness of 100 nm, and $YBO_3$:Tb was deposited on the first phosphor layer to form a second phosphor thin layer with a thickness of 5 nm, thereby providing a PDP having a green phosphor layer Example 5

$Zn_2SiO_4$:Mn green phosphor was dispersed in a vehicle in which ethyl cellulose as a binder was dissolved in a mixed solvent of butyl carbitol acetate and terpineol at a weight ratio of 3:7 to obtain a phosphor paste. The phosphor paste was coated in discharge cells of a PDP and sintered to form a first phosphor layer with a thickness of 20 µm. Then $YBO_3$:Tb was coated thereon using chemical vapor deposition to form a second thin phosphor layer with a thickness of 5 nm to manufacture a PDP.

Comparative Example 1

A PDP was manufactured in the same manner as in Example 3, except that a green phosphor layer was formed using only $Zn_2SiO_4$:Mn as a green phosphor at a thickness of 20 µm.

Comparative Example 2

A PDP was manufactured in the same manner as in Example 3, except that a green phosphor layer was formed using only $YBO_3$:Tb as a green phosphor at a thickness of 20 µm.

Comparative Example 3

A PDP was manufactured in the same manner as in Example 3, except that a green phosphor layer was formed using a green phosphor including $Zn_2SiO_4$:Mn and $YBO_3$:Tb in a mixing weight ratio of 1:1 with a thickness of 20 µm.

After only the green phosphor patterns of each of the PDPs of Examples 3 to 5 and Comparative Examples 1 to 3 were excited, the brightness of the green light was measured using a colorimeter (CA-100) to evaluate the brightness maintenance ratio (lifespan). The permanent after-image was evaluated by measuring variation in color temperature. The variation of the color temperature was evaluated by measuring the difference of color temperature and the brightness difference between a display portion and a non-display portion after accelerated aging of a predetermined pattern for a predetermined time. Usually when the color temperature is about 9000K, the brightness difference is greater than or equal to 5 $cd/m^2$, and when the difference of color temperature is greater than or equal to 300K, permanent after-image occurs when the aging time is a value for evaluating permanent after-image time (decay time). The results are shown in Table 2.

TABLE 1

|  | Brightness maintenance ratio (%) | Permanent after-image time (decay time) |
|---|---|---|
| Example 3 | 99%/200 hr | 100 hr |
| Example 4 | 99%/200 hr | 100 hr |
| Example 5 | 99%/200 hr | 100 hr |
| Comparative Example 1 | 94%/200 hr | 12 hr |
| Comparative Example 2 | 90%/200 hr | 6 hr |
| Comparative Example 3 | 88%/200 hr | 3 hr |

As shown in Table 1, the brightness maintenance ratios of Examples 3 to 5 after 200 hours are better than those of Comparative Examples 1 to 3 by more than about 5%. The permanent after-image times of Examples 3 to 5 are improved in that they are more than about eight times those of Comparative Examples 1 to 3.

The plasma display panel of the present invention comprising a multi-layered phosphor layer which has improved color purity, improved lifespan, and improved discharge stability.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A green phosphor for a plasma display panel, comprising:
   a core including at least one first phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and
   a coating layer including a second phosphor which is present on the surface of the first phosphor, and which is at least one selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

2. The green phosphor according to claim 1, wherein the coating layer has a thickness in a range of 1 to 100 nm.

3. The green phosphor according to claim 1, wherein the coating layer has a thickness in a range of 2 to 50 nm.

4. A green phosphor for a plasma display panel, comprising:
   a core including a Zn-based phosphor; and
   a coating layer including a Y-based phosphor;
   wherein the Y-based phosphor is $(Y, Gd)BO_3$:Tb.

5. The green phosphor according to claim 4, wherein the Zn-based phosphor is at least one selected from the group consisting of $Zn_2SiO_4$:Mn and $(Zn,A)_2SiO_4$:Mn (A is an alkaline earth metal).

6. The green phosphor according to claim 4, wherein the coating layer has a thickness ranging from 1 to 100 nm.

7. The green phosphor according to claim 6, wherein the coating layer has a thickness in a range of 2 to 50 nm.

8. A plasma display panel comprising a phosphor layer which includes a red phosphor pattern, a green phosphor pattern, and a blue phosphor pattern, the green phosphor pattern comprising a green phosphor formed in a green discharge cell, the green phosphor comprising:
   a core including at least one first phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and
   a coating layer including a second phosphor which is present on the surface of the first phosphor, and which is at least one selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

9. A plasma display panel comprising at least two thin green phosphor layers, said at least two thin green phosphor layers comprising:
   a first phosphor layer formed in a discharge cell and comprising a phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and
   a second phosphor layer formed on the first phosphor layer and comprising a phosphor material selected from the group consisting of a $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

10. The plasma display panel according to claim 9, wherein the second phosphor layer has a thickness in a range of 10 to 100 nm.

11. The plasma display panel according to claim 10, wherein the second phosphor layer has a thickness in a range of 10 to 50 nm.

12. A plasma display panel comprising at least two thin green phosphor layers, said at least two thin phosphor layers comprising:
   a first phosphor layer formed in a discharge cell and comprising a Zn-based phosphor; and
   a second phosphor formed on the first phosphor layer and comprising a Y-based phosphor;
   wherein the second phosphor layer has a thickness in a range of 10 to 100 nm.

13. The plasma display panel according to claim 12, wherein the Zn-based phosphor is at least one selected from the group consisting of $Zn_2SiO_4$:Mn and $(Zn,A)_2SiO_4$:Mn (A is an alkaline earth metal).

14. The plasma display panel according to claim 12, wherein the Y-based phosphor is at least one selected from the group consisting of $YBO_3$:Tb and $(Y, Gd)BO_3$:Tb.

15. The plasma display panel according to claim 12, wherein the second phosphor layer has a thickness in a range of 10 to 50 nm.

16. A plasma display panel comprising:
   a first phosphor layer which is formed by coating phosphor particles in discharge cells, and which comprises a phosphor material selected from the group consisting of $Zn_2SiO_4$:Mn, $(Zn,A)_2SiO_4$:Mn (A is an alkaline earth metal), $(Ba,Sr,Mg)O.\alpha Al_2O_3$:Mn ($\alpha$ is an integer in the range of 1 to 23), and $MgAl_xO_y$:Mn (x is an integer in the range of 1 to 10, and y is an integer in the range of 1 to 30); and
   a second phosphor which is a thin layer formed on the first phosphor layer and which comprises a phosphor material selected from the group consisting of $LaMgAl_xO_y$:Tb (x is an integer in the range of 1 to 14, and y is an integer in the range of 8 to 47), $ReBO_3$:Tb (Re is a rare earth element selected from the group consisting of Sc, Y, La, Ce, and Gd), and $(Y, Gd)BO_3$:Tb.

17. The plasma display panel according to claim 16, wherein the second phosphor layer has a thickness in a range of 10 to 100 nm.

18. The plasma display panel according to claim 17, wherein the second phosphor layer has a thickness in a range of 10 to 50 nm.

19. A plasma display panel, comprising:
   a first phosphor layer which is formed by coating phosphor particles in discharge cells, and comprising a Zn-based phosphor; and
   a second phosphor which is a thin layer formed on the first phosphor layer, and comprising a Y-based phosphor.

20. The plasma display panel according to claim 19, wherein the Zn-based phosphor is at least one selected from the group consisting of $Zn_2SiO_4$:Mn and $(Zn,A)_2SiO_4$:Mn (A is an alkaline earth metal).

21. The plasma display panel according to claim 19, wherein the Y-based phosphor is at least one selected from the group consisting of $YBO_3$:Tb and $(Y, Gd)BO_3$:Tb.

22. The plasma display panel according to claim 19, wherein the second phosphor layer has a thickness in a range of 10 to 100 nm.

23. The plasma display panel according to claim 22, wherein the second phosphor layer has a thickness in a range of 10 to 50 nm.

* * * * *